United States Patent
Johnson et al.

(10) Patent No.: US 9,687,773 B2
(45) Date of Patent: Jun. 27, 2017

(54) FUEL DEOXYGENATION AND FUEL TANK INERTING SYSTEM AND METHOD

(71) Applicant: HONEYWELL INTERNATIONAL INC., Morristown, NJ (US)

(72) Inventors: Russell W. Johnson, Elmhurst, IL (US); Peter M Michalakos, Arlington Heights, IL (US); Eric Blumer, Scottsdale, AZ (US); Alexander Bershitsky, Northbrook, IL (US); Charles Lo, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 50 days.

(21) Appl. No.: 14/310,531

(22) Filed: Jun. 20, 2014

(65) Prior Publication Data

US 2015/0314229 A1 Nov. 5, 2015

Related U.S. Application Data

(60) Provisional application No. 61/986,464, filed on Apr. 30, 2014.

(51) Int. Cl.
  *B01D 19/00* (2006.01)
  *B01D 53/047* (2006.01)
  (Continued)

(52) U.S. Cl.
  CPC ....... *B01D 53/047* (2013.01); *B01D 19/0005* (2013.01); *B01D 19/0026* (2013.01);
  (Continued)

(58) Field of Classification Search
  None
  See application file for complete search history.

(56) References Cited

U.S. PATENT DOCUMENTS

| 1,734,507 A | 11/1929 | Westling et al. |
| 2,468,070 A | 4/1949 | Hunter |

(Continued)

FOREIGN PATENT DOCUMENTS

| AU | 573534 | 8/1983 |
| EP | 0475930 A1 | 3/1992 |

(Continued)

OTHER PUBLICATIONS

EP Search Report for Application No. 15198311.1-1754, dated May 24, 2016.

(Continued)

*Primary Examiner* — Amber R Orlando
*Assistant Examiner* — Phillip Shao
(74) *Attorney, Agent, or Firm* — Lorenz & Kopf, LLP

(57) ABSTRACT

An aircraft fuel deoxygenation and tank inerting system includes an inert gas source, a fuel deoxygenation system, and an air/fuel heat exchanger. The inert gas source is configured to supply inert gas having an oxygen concentration of less than 3%. The fuel deoxygenation system is adapted to receive fuel from a fuel source and the inert gas from the inert gas source. The fuel deoxygenation system is configured to remove oxygen from the fuel and thereby generate and supply deoxygenated fuel and oxygen-rich purge gas. The air/fuel heat exchanger is adapted to receive compressed air from a compressed air source and the deoxygenated fuel from the fuel deoxygenation system. The air/fuel heat exchanger is configured to transfer heat from the compressed air to the deoxygenated fuel, to thereby supply cooled compressed air and heated deoxygenated fuel.

19 Claims, 13 Drawing Sheets

(51) Int. Cl.
*B01D 53/22* (2006.01)
*B01D 53/86* (2006.01)

(52) U.S. Cl.
CPC .......... *B01D 53/225* (2013.01); *B01D 53/229* (2013.01); *B01D 53/864* (2013.01); *B01D 2053/221* (2013.01); *B01D 2256/10* (2013.01); *B01D 2257/104* (2013.01); *B01D 2257/702* (2013.01); *B01D 2258/06* (2013.01)

(56) References Cited

U.S. PATENT DOCUMENTS

| | | | |
|---|---|---|---|
| 2,575,568 | A | 11/1951 | Topanelian, Jr. |
| 2,941,619 | A | 6/1960 | Sochor |
| 3,233,389 | A | 2/1966 | D.M. Dahlen |
| 3,359,708 | A | 12/1967 | Barber |
| 3,507,479 | A | 4/1970 | Pearl |
| 3,663,117 | A | 5/1972 | Warren |
| 3,691,730 | A | 9/1972 | Hickey et al. |
| 3,706,383 | A | 12/1972 | Palma |
| 3,788,039 | A | 1/1974 | Bragg |
| 3,847,298 | A | 11/1974 | Hamilton |
| 3,867,056 | A | 2/1975 | Carle et al. |
| 3,948,626 | A | 4/1976 | Bragg |
| 4,017,276 | A | 4/1977 | Bloem |
| 4,070,168 | A | 1/1978 | Beattie |
| 4,190,030 | A | 2/1980 | Chester |
| 4,890,980 | A | 1/1990 | Heald et al. |
| 4,895,683 | A | 1/1990 | Iwasaki |
| 4,900,335 | A | 2/1990 | Algers |
| 5,061,151 | A | 10/1991 | Steiger |
| 5,112,357 | A | 5/1992 | Bjerklund et al. |
| 5,207,734 | A | 5/1993 | Day et al. |
| 5,316,682 | A | 5/1994 | Keyser et al. |
| 5,405,497 | A | 4/1995 | Torregrossa |
| 5,472,567 | A | 12/1995 | Torregrossa |
| 5,522,917 | A | 6/1996 | Honda et al. |
| 5,529,701 | A | 6/1996 | Grisham et al. |
| 5,531,904 | A | 7/1996 | Grisham et al. |
| 5,662,811 | A | 9/1997 | Grisham et al. |
| 5,858,283 | A | 1/1999 | Burris |
| 5,863,031 | A | 1/1999 | Veeder et al. |
| 6,004,386 | A | 12/1999 | Grisham et al. |
| 6,053,249 | A | 4/2000 | Stevenson et al. |
| 6,295,972 | B1 | 10/2001 | Radue |
| 6,315,815 | B1 | 11/2001 | Spadaccini et al. |
| 6,423,235 | B1 | 7/2002 | Shimoi et al. |
| 6,431,528 | B1 | 8/2002 | Kojima |
| 6,660,067 | B2 | 12/2003 | Stacy et al. |
| 6,709,492 | B1 | 3/2004 | Spadaccini et al. |
| 6,822,125 | B2 | 11/2004 | Lee et al. |
| 6,830,608 | B1 | 12/2004 | Peters |
| 6,918,949 | B1 | 7/2005 | Peters |
| 6,939,392 | B2 | 9/2005 | Huang et al. |
| 7,093,437 | B2 | 8/2006 | Spadaccini et al. |
| 7,104,530 | B2 | 9/2006 | Boye |
| 7,153,343 | B2 | 12/2006 | Burlatsky et al. |
| 7,186,328 | B1 | 3/2007 | Schultz et al. |
| 7,231,768 | B2 | 6/2007 | Spadaccini et al. |
| 7,260,926 | B2 | 8/2007 | Sabatino et al. |
| 7,264,655 | B2 | 9/2007 | Joynson |
| 7,326,283 | B2 | 2/2008 | Gardner et al. |
| 7,806,966 | B2 | 10/2010 | Bose |
| 7,819,275 | B2 | 10/2010 | Stodd et al. |
| 7,892,321 | B2 | 2/2011 | Aagesen et al. |
| 7,896,232 | B1 | 3/2011 | Prasad et al. |
| 3,221,070 | A1 | 7/2012 | Baryshnikov |
| 8,388,740 | B2 | 3/2013 | Sohn et al. |
| 8,602,362 | B2 | 12/2013 | Buchwald |
| 9,334,109 | B1 | 5/2016 | Mueller et al. |
| 2005/0019578 | A1 | 1/2005 | Bosteels |
| 2005/0019623 | A1 | 1/2005 | Shoji et al. |
| 2005/0126391 | A1 | 6/2005 | Staroselsky et al. |
| 2005/0211096 | A1* | 9/2005 | Burlatsky .......... B01D 19/0031 96/6 |
| 2005/0217489 | A1 | 10/2005 | Tovar Depablos |
| 2005/0274649 | A1* | 12/2005 | Spadaccini ............ C10G 31/11 208/177 |
| 2006/0113248 | A1 | 6/2006 | Koenig et al. |
| 2006/0169138 | A1* | 8/2006 | Schmidt ............ B01D 19/0031 95/54 |
| 2006/0278073 | A1* | 12/2006 | McHugh ............ B01D 19/0031 95/46 |
| 2007/0163433 | A1 | 7/2007 | Chen et al. |
| 2007/0163438 | A1 | 7/2007 | Chiappetta et al. |
| 2007/0163439 | A1 | 7/2007 | Coffin et al. |
| 2007/0220873 | A1 | 9/2007 | Bosteels |
| 2008/0095681 | A1* | 4/2008 | Koenig .................. B01D 1/305 423/210 |
| 2009/0156875 | A1 | 6/2009 | Tomioka et al. |
| 2010/0239954 | A1 | 9/2010 | Dan |
| 2010/0294128 | A1 | 11/2010 | Schmidt et al. |
| 2011/0033768 | A1 | 2/2011 | Takeguchi et al. |
| 2011/0131870 | A1 | 6/2011 | Poirier et al. |
| 2012/0118154 | A1 | 5/2012 | Wu et al. |
| 2013/0068660 | A1 | 3/2013 | Bergeron et al. |
| 2013/0219914 | A1 | 8/2013 | Budge |
| 2013/0312376 | A1 | 11/2013 | Huff et al. |
| 2016/0167802 | A1 | 6/2016 | Lo et al. |

FOREIGN PATENT DOCUMENTS

| | | |
|---|---|---|
| EP | 0645168 B1 | 6/1997 |
| EP | 1958691 A1 | 8/2008 |
| EP | 1579902 B1 | 2/2009 |
| EP | 2631281 A3 | 9/2013 |
| GB | 735866 A | 8/1955 |
| WO | 9402234 | 2/1994 |
| WO | 02/28714 A1 | 4/2002 |
| WO | 03/024582 A1 | 3/2003 |
| WO | 2013110950 | 8/2013 |

OTHER PUBLICATIONS

Lo et al.; Flight Deoxygenation System Contactor-Separator; U.S. Appl. No. 14/539,279, filed Nov. 12, 2014.
Lo et al.; Aircraft Fuel Deoxygenation System; U.S. Appl. No. 14/570,152, filed Dec. 15, 2014.
Lo et al.; Centrifugal Fuel Pump With Variable Pressure Control; U.S. Appl. No. 14/597,938, filed Jan. 15, 2015.
E.S. Rosa, et al. "The cyclone gas-liquid separator: operation and mechanistic modeling," IEEE Acal Energy Limited, Aug. 1, 2013.
S. Darrah; "Jet Fuel Deoxygenation" DTIC; http://www.dtic.mil/dtic/tr/fulltext/u2/a205006.pdf Oct. 1988.
Patel et al. "Cascade Distillation System" A water recovery system for deep space missions, Jan. 2014, vol. 6, Issue No. 1.
EP Extended Search Report for Application No. 16150501.1-1607, dated Jun. 10, 2016.
USPTO Office Action for U.S. Appl. No. 14/539,279 dated Oct. 21, 2016.
USPTO Notice of Allowance for U.S. Appl. No. 14/539,279 dated Dec. 14, 2016.
Roan, Melissa A. and Andre L. Boehman, "The Effect of Fuel Composition and Dissolved Oxygen on Deposit Formation from Potential JP-900 Basestocks." American Chemical Society, Apr. 13, 2004.
Deuel, Charles L. "Compact Seawater Deoxygenation System Improvements for Floating Production Facilities," SPE International, SPE 74358, Feb. 2010-Dec. 2002.
Vielvoye, Roger, "World's Largest TLP Moves Onto Deepwater Norwegian Location," Oil and Gas Journal, May 4, 1992.
USPTO Office Action for U.S. Appl. No. 14/597,938 dated Mar. 24, 2017.

* cited by examiner

FUEL DEOXYGENATION AND FUEL TANK INERTING SYSTEM AND METHOD

CROSS-REFERENCE TO RELATED APPLICATION

This application claims the benefit of U.S. Provisional Application No. 61/986,464, filed Apr. 30, 2014.

TECHNICAL FIELD

The present invention generally relates to fuel deoxygenation, and more particularly relates to systems and methods for deoxygenating fuel and, in some embodiments, inerting fuel tanks.

BACKGROUND

Modern aircraft rely on efficient heat sink options for thermal management. The jet fuel that is supplied to the propulsion engines is often a convenient sink for excess thermal energy, and the energy is efficiently retained in the engine thermodynamic cycle. The presence of molecular oxygen or entrained air limits the ability of fuel to absorb heat beyond approximately 300° F. without undergoing deleterious thermal degradation. Thermal degradation often appears as solid materials which adhere to surfaces and degrades fuel system performance increase. Moreover, wetted surfaces comprised of metallic materials can further catalyze the reaction of oxygen with fuel and subsequent formation of carbonaceous, coke-like material.

It is possible to substantially reduce coke-based fuel degradation by removing oxygen from the fuel prior to increasing the fuel temperature beyond about 300° F. Several deoxygenation techniques have been developed. However, these often use equipment that is subject to fouling, which can lead to increased maintenance, and/or process steps that are difficult to control.

Therefore, there is a need for a relatively low-maintenance, and/or relatively easy-to-control deoxygenation system. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft fuel deoxygenation and tank inerting system includes an inert gas source, a fuel deoxygenation system, and an air/fuel heat exchanger. The inert gas source is configured to supply inert gas having an oxygen concentration of less than 3%. The fuel deoxygenation system is adapted to receive fuel from a fuel source and the inert gas from the inert gas source. The fuel deoxygenation system is configured to remove oxygen from the fuel and thereby generate and supply deoxygenated fuel and oxygen-rich purge gas. The air/fuel heat exchanger is adapted to receive compressed air from a compressed air source and the deoxygenated fuel from the fuel deoxygenation system. The air/fuel heat exchanger is configured to transfer heat from the compressed air to the deoxygenated fuel, to thereby supply cooled compressed air and heated deoxygenated fuel.

In another embodiment, a fuel deoxygenation system includes a housing and a disk. The housing has a fuel inlet, a fuel outlet, a gas inlet, and a gas outlet. The fuel inlet is adapted to receive fuel from a fuel source, and the gas inlet is adapted to receive inert gas from an inert gas source. The disk is rotationally mounted in the housing and is coupled to receive a drive torque. The disk is configured, upon receipt of the drive torque, to rotate and thereby produce a thin film of fuel thereon and propel fuel radially outward toward an outer perimeter of the disk.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
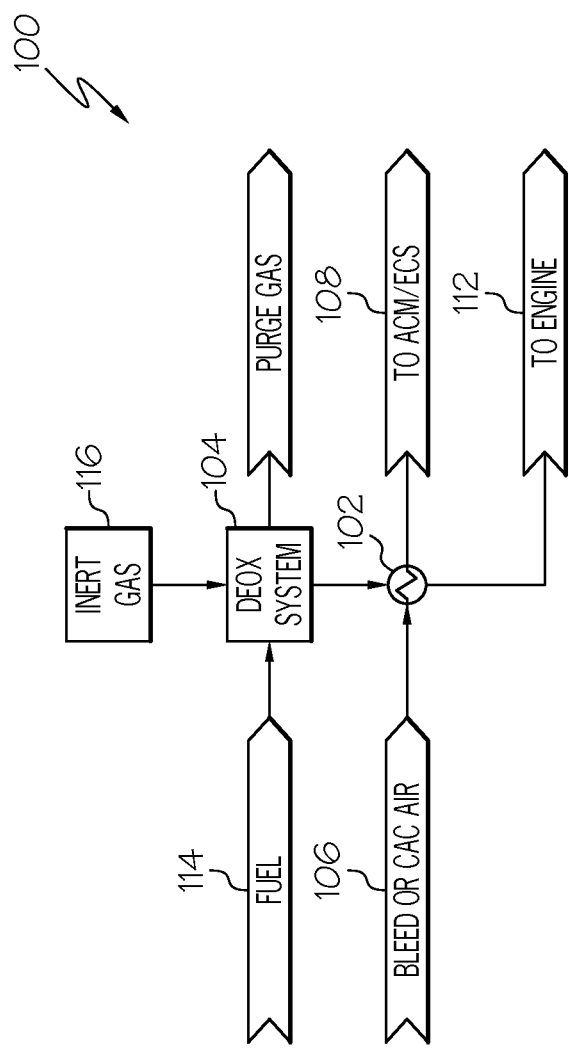
FIGS. 1-3 depict simplified schematic representations of embodiments of integrated deoxygenation and fuel inerting systems.
Figure 2:
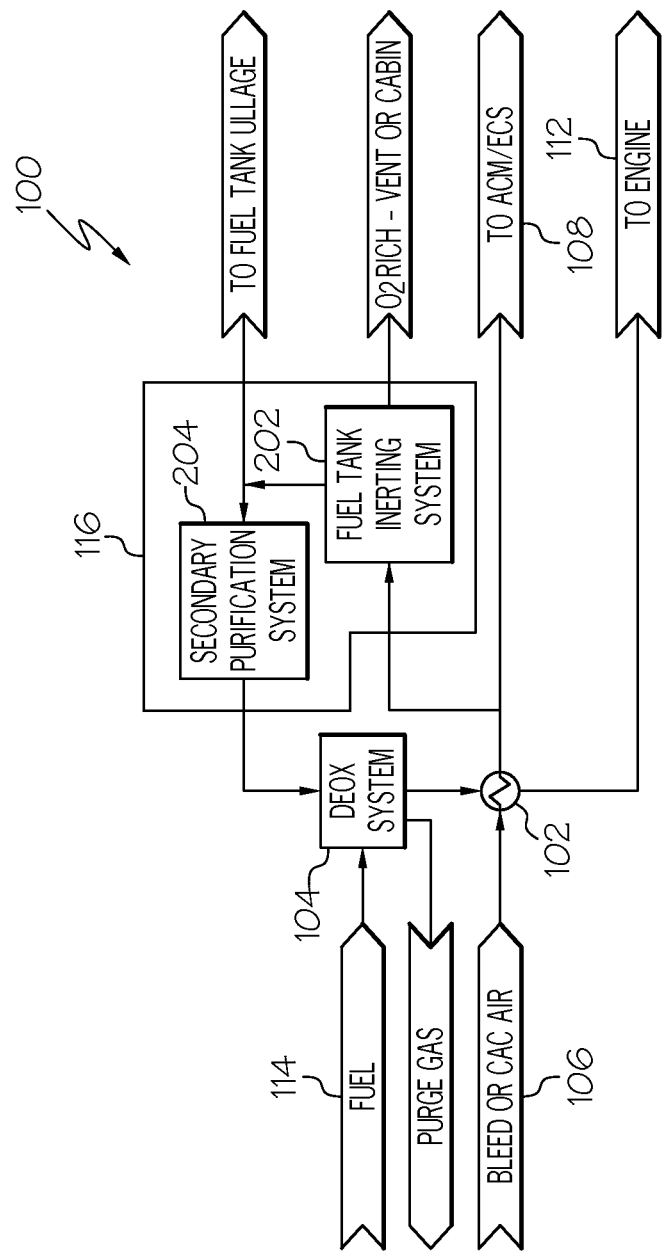
Figure 3:
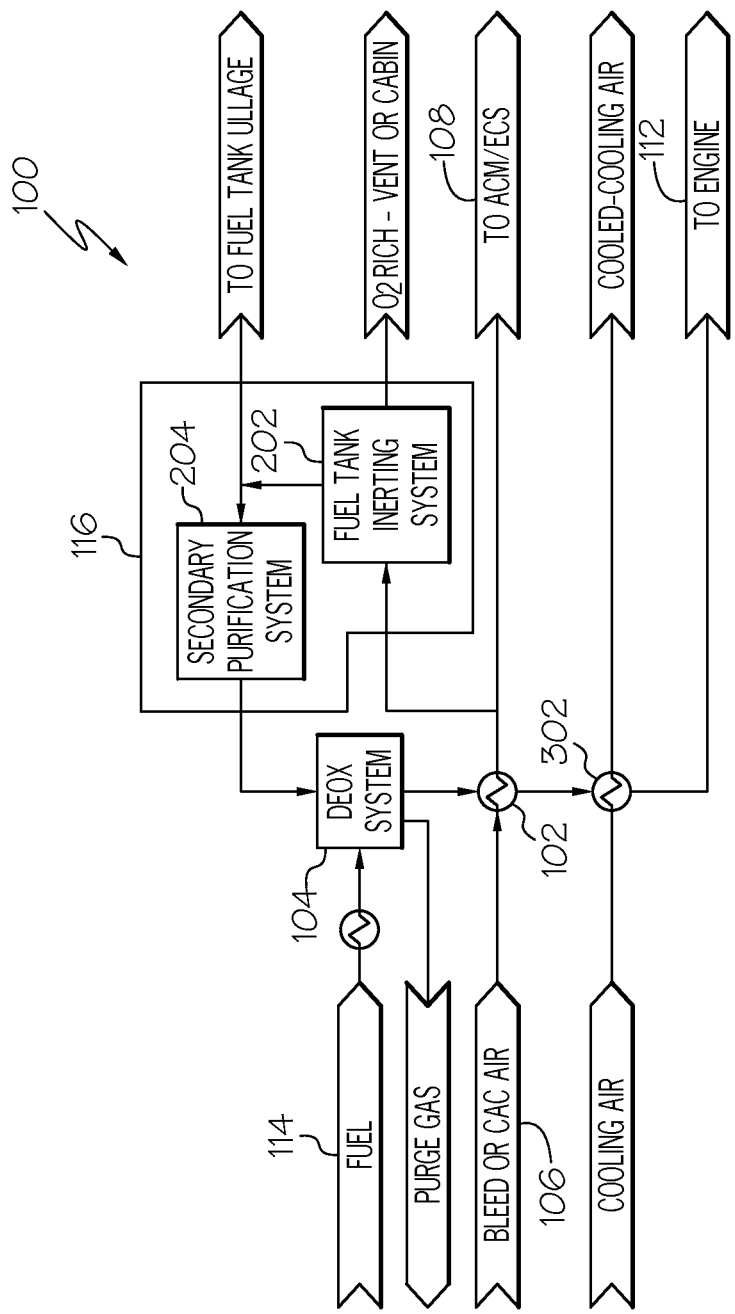

Referring first to FIGS. 1-3, embodiments of an integrated deoxygenation and fuel inerting system 100 is depicted. Each of the depicted systems 100 includes an air/fuel heat exchanger 102 and a fuel deoxygenation system 104. The air/fuel heat exchanger 102 is coupled to receive compressed air from a compressed air source 106, and deoxygenated fuel from the fuel deoxygenation system 104. In the air/fuel heat exchanger 102, heat is transferred from the compressed air to the deoxygenated fuel to thereby supply relatively cool compressed air and relatively hot deoxygenated fuel. The relatively cool compressed air is supplied to a load 108, such as an air cycle machine or environmental control system, and the relatively hot deoxygenated fuel is supplied to a gas turbine engine 112.

The fuel deoxygenation system 104 is coupled to receive fuel from a fuel source 114, and an inert gas, such as nitrogen ($N_2$), from an inert gas source 116. The fuel deoxygenation system 104 is configured to remove oxygen from the fuel and, as described above, supply the deoxygenated fuel to the air/fuel heat exchanger 102. The embodiments of the fuel deoxygenation system 104 that are described in more detail further below will reduce dissolved oxygen in the fuel from about 70 ppm to less than 10 ppm and, in some instance, less than 1 ppm.

The inert gas source 116 may be a stand-alone source of inert gas or, as depicted in FIGS. 2 and 3, it may be the on-board fuel tank inerting system 202. The fuel tank inerting system 202 may be variously configured and implemented. In one particular embodiment, relatively high pressure air, such as a portion of the relatively cool compressed air, is fed to a fuel tank inerting membrane 402 (see FIG. 4). A typical fuel tank inerting membrane is comprised of a large number of hollow tubes that have preferential permeance for oxygen over nitrogen. Thus, as the compressed air flows through the hollow tubes, nitrogen-rich gas and oxygen-rich gas are produced. The oxygen-rich gas is vented to a lower pressure environment, such as overboard or to the aircraft cabin. A major portion of the nitrogen-rich gas is supplied to the fuel tank ullage, and another portion is supplied to a secondary purification system 204. It will be appreciated that the fuel tank inerting system 202 may alternatively be configured as a pressure-swing adsorption system, a catalytic inert gas generation system, stored inert gas in a cylinder, cryogenic inert gas, or any one of numerous other supplies of low-oxygen inert gas.

The nitrogen-rich gas that the fuel tank inerting system 202 supplies typically has an oxygen concentration of about 10-12%, which is sufficient to inert the fuel tank(s). However, it is preferable the the fuel deoxygenation system 104 be supplied with nitrogen-rich gas having an oxygen concentration below 1%, and most preferably below 0.5%. Although the size of, and flow through, the fuel tank inerting membrane could be adjusted to yield a gas with less than 1% oxygen, in preferred embodiments the secondary purification system 204 is used. The secondary purification system 204 further reduces the concentration of oxygen from approximately 10-12% to less than 1%, and most preferably less than 0.5%. The lower concentration of oxygen generated by the secondary purification system 204 allows a greater reduction of oxygen from the fuel and therefore better fuel thermal stability.

Figure 4:
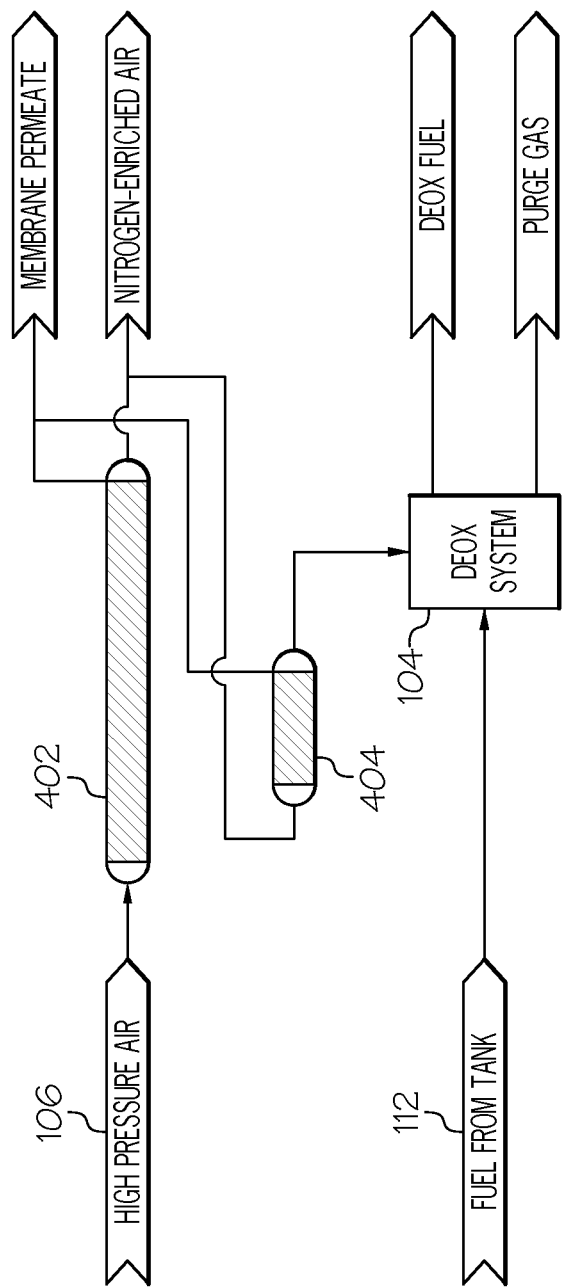
FIGS. 4-6 depict various embodiments of inert gas sources that may be used to implement the systems of FIGS. 1-3.

The secondary purification system 204 may be implemented using any one of numerous known technologies. For example, it may be configured as a pressure-swing adsorption system, a catalytic oxidation system, or a chemical reactant such as an activated metal. In one embodiment, which is depicted in FIG. 4, the secondary purification system 204 is configured as a second inerting membrane 404. The second inerting membrane 404 is configured similar to the fuel tank inerting membrane 402, and thus produces nitrogen-rich gas and oxygen-rich gas. A portion of the nitrogen-rich gas discharged from the fuel tank inerting membrane 402 is supplied to the second inerting membrane 404. Generally, the flow requirement for the second inerting membrane 404 is much less than the flow requirement for the fuel tank inerting membrane 402. The second inerting membrane 404 provides a second separation step, which supplies much higher concentration nitrogen and much lower concentration oxygen to fuel deoxygenation system 104. The nitrogen-rich gas discharged from the fuel tank inerting membrane 402 is at a relatively high pressure. As such, there is sufficient pressure to induce permeation of oxygen through the second inerting membrane 404. Alternatively, a non-illustrated boost pump may be used to pressurize the nitrogen-rich gas to achieve better performance in the second membrane. The oxygen-rich gas from the second inerting membrane 404 may be combined with that from the fuel inerting membrane 402 and supplied to the fuel tank (s), or it may be vented.

Figure 5:
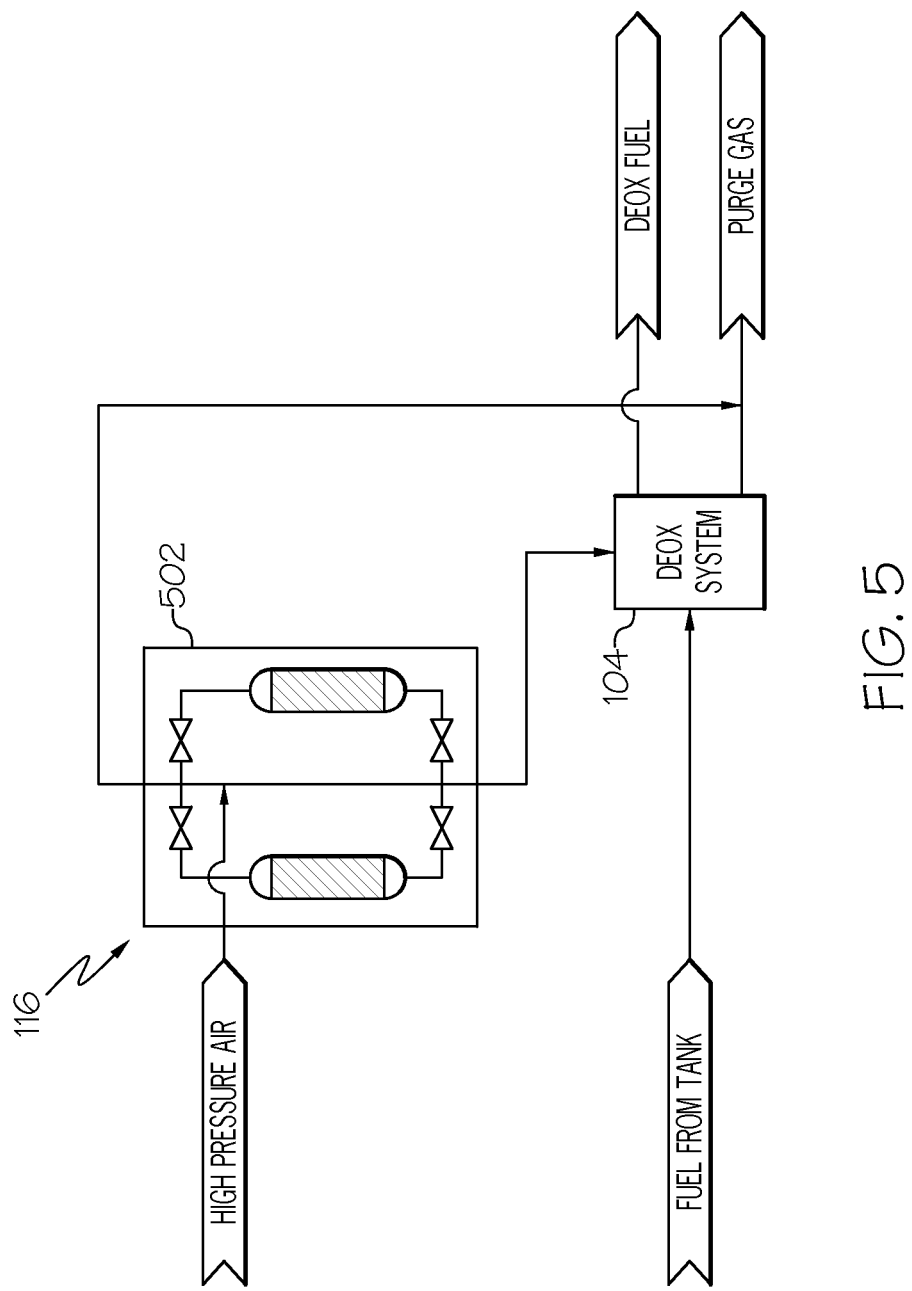

It was previously noted that the inert gas source 116 could be a stand-alone source, and that one or both of the fuel tank inerting system 202 and secondary purification system 204 could be variously implemented. Referring now to FIG. 5, an embodiment is depicted in which the inert gas source 116 is implemented as a pressure-swing adsorption (PSA) generator 502. In the depicted embodiment, the PSA generator 502 is configured as a twin-tower adsorbent that separates oxygen and nitrogen from the relatively high pressure air. The nitrogen from the PSA generator 502 is supplied to the fuel deoxygenation system 104. One advantage of this embodiment is the relatively high separation of nitrogen possible in a small PSA generator. It will be appreciated that the PSA generator 502 may be used by itself or in combination with one or more other systems to provide very high purity nitrogen and therefore very low concentrations of residual oxygen in the deoxygenated fuel.

Figure 6:
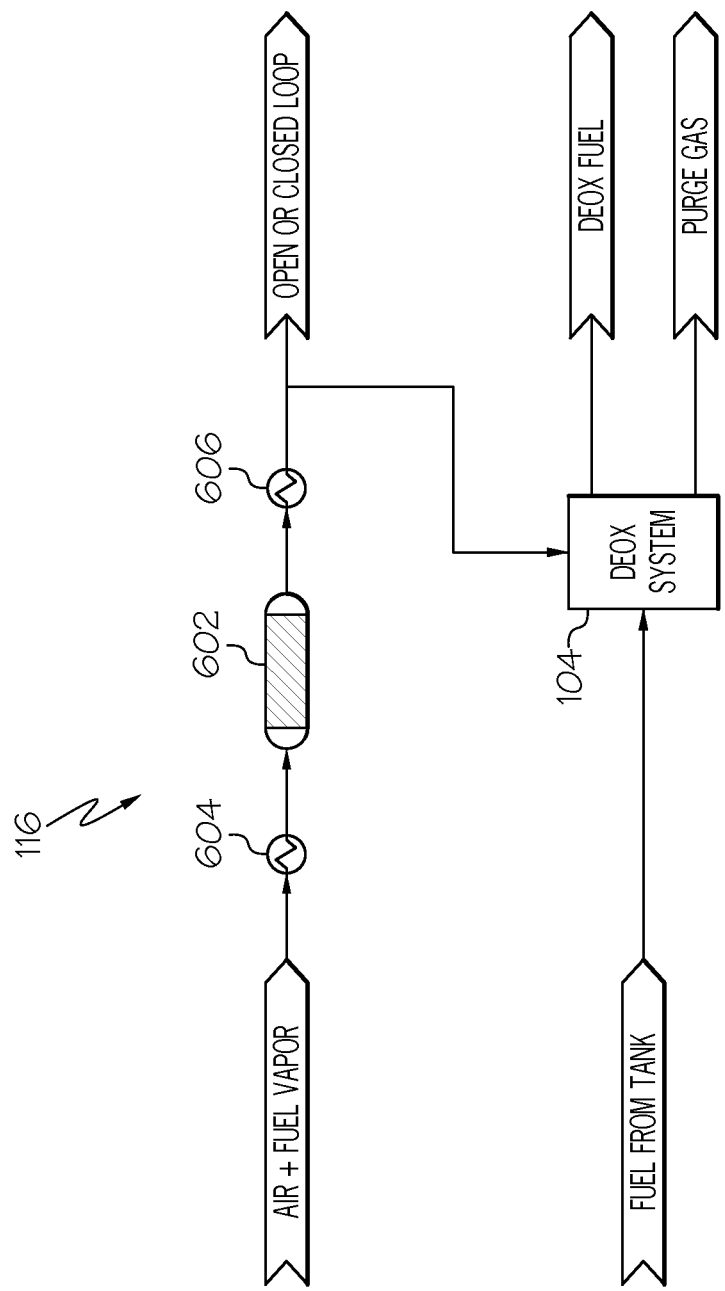

In another embodiment, which is depicted in FIG. 6, the inert gas source 116 is implemented using a catalytic reactor 602 to oxidize fuel vapor and thereby deplete oxygen. In the depicted embodiment, a catalyst can be used to promote this reaction at relatively low temperature. Generally a first heat exchanger 604 is used to raise the temperature of the air and fuel vapor mixture to the point where it can catalytically oxidize. Moreover, because this reaction is exothermic, a second heat exchanger 606 is used decrease the temperature to a level that is safe for venting in an open system or for recycling to the fuel tank in a closed loop system. Regardless, a small amount of gas, which is comprised of carbon dioxide, highly concentrated nitrogen, and trace inert gas (e.g., argon), is diverted to the fuel deoxygenation system 104. It is additionally noted that the catalytic combustion process also generates water, which is removed by a non-illustrated water separator before use.

In some embodiments, the inert gas source 116 may be implemented as a multi-stage device in which the first stage comprises a membrane, and the second stage comprises one of a pressure-swing adsorption (PSA) generator, a membrane, or a catalytic reactor. In yet other embodiments, the first stage comprises a catalytic reactor, and the second stage comprises one of a membrane, a pressure-swing adsorption (PSA) generator, or a catalytic reactor.

Before proceeding further it is noted that in some embodiments, such as the one depicted in FIG. 3, the relatively hot fuel may be supplied to a second heat exchanger 302 before being supplied to the engine. In these embodiments, cooling air is supplied to the second heat exchanger 302 to thereby supply cooled-cooling air. This embodiment reduces the amount of bleed air used to cool engine equipment. It is additionally noted that the embodiments depicted in FIGS. 1-3 may also include a heat exchanger for the fuel deoxygenation system 104. It is typically most desirable to add heat downstream of the fuel deoxygenation system 104. However, the embodiments disclosed herein also allow some heat to be added upstream of the fuel deoxygenation system 104 to increase the rate at which deoxygenation will occur and to accomplish more extensive deoxygenation due to the lower oxygen solubility in fuel at higher temperatures.

Figure 7:
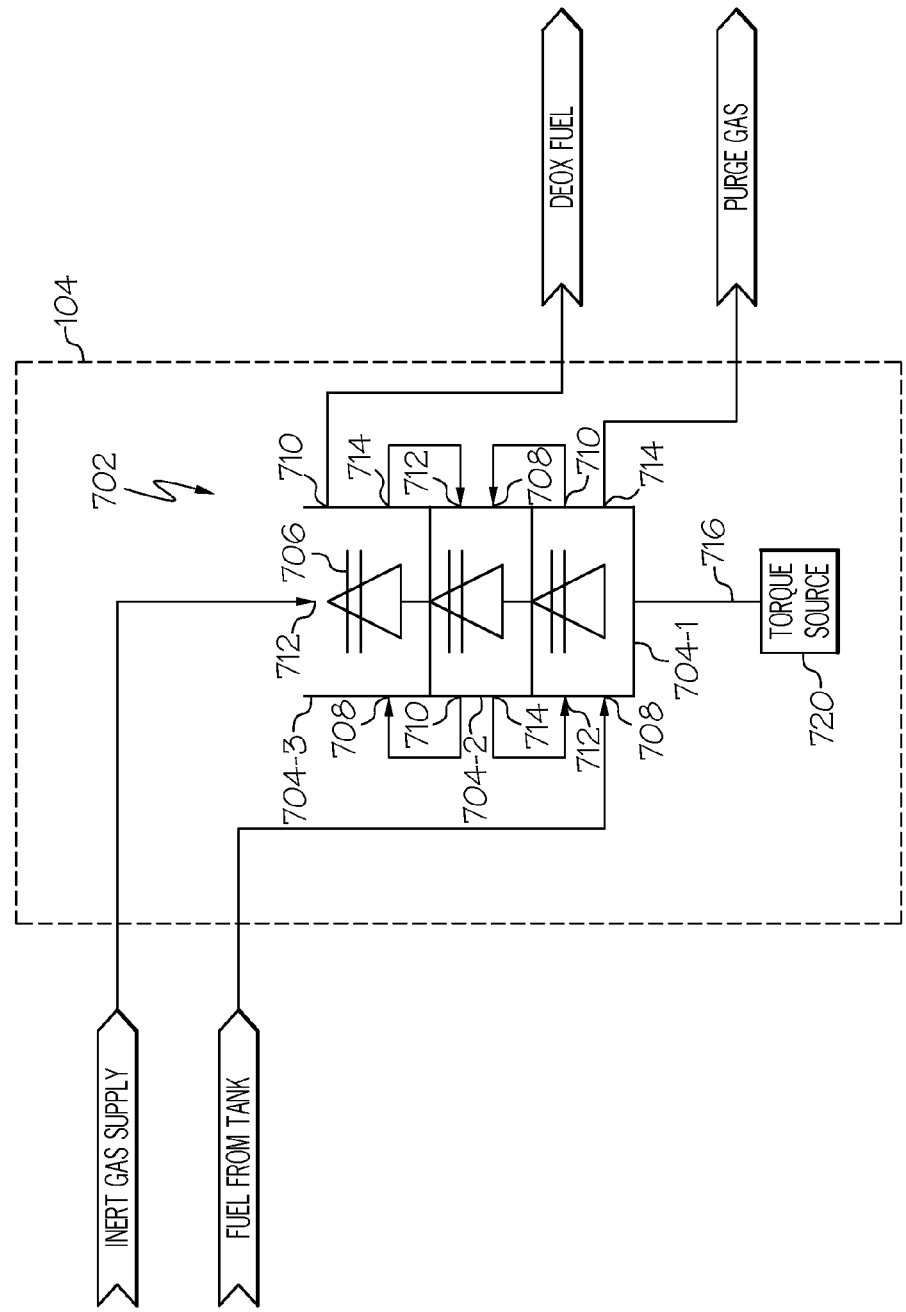
FIGS. 7-14 depict various embodiments of fuel deoxygenation systems that may be used to implement the systems of FIGS. 1-3.

Referring now to FIG. 7, one embodiment of the fuel deoxygenation system 104 is depicted and will be described. The depicted deoxygenation system 104 includes an integrated contactor and separator 702, referred to herein as a contactor-separator assembly (CSA). The CSA 702 may be implemented using one stage or a plurality of stages. In the depicted embodiment, the CSA is implemented using three stages 704 (704-1, 704-2, 704-3). Regardless of the number of stages, each stage 704 preferably includes one or more disks 706, a fuel inlet 708, a fuel outlet 710, a gas inlet 712, and a gas outlet 714. The disks 706 are preferably mounted on a common shaft 716, and the stages 704 are separated by a mechanical barrier (or housing) 718. The shaft 716 is coupled to a torque source 720 that supplies a drive torque to the shaft 716, thereby rotating the shaft 716 and the disks 706.

Figure 8:
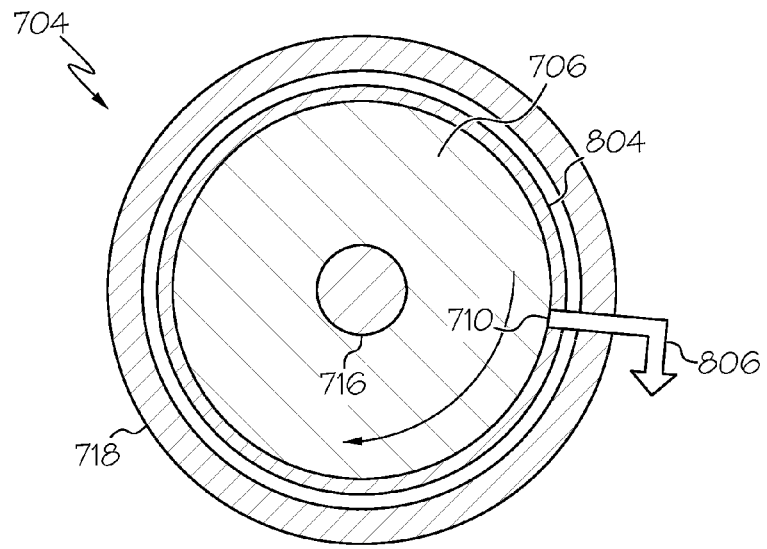
Figure 9:
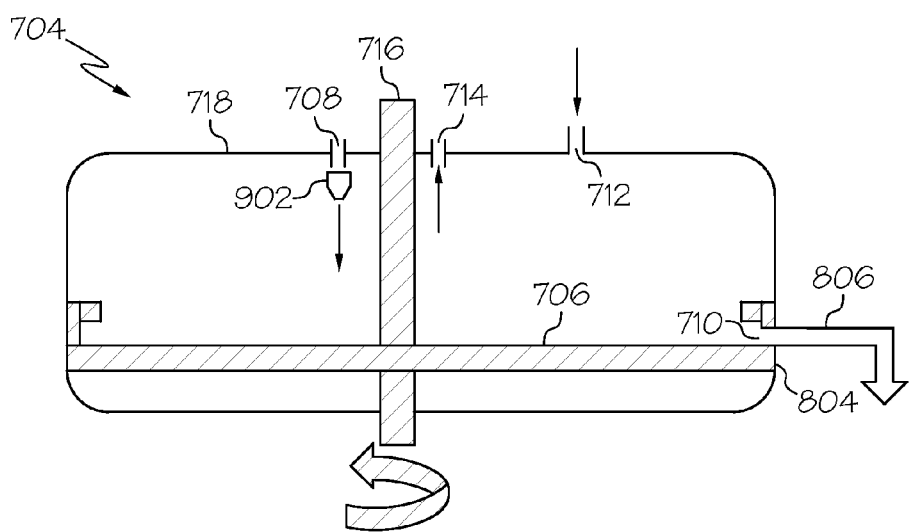

As shown more clearly in FIGS. 8 and 9, which are simplified end and side views, respectively, of one stage 704, fuel is injected into a stage 704 in a direction that is preferably perpendicular to the spinning disk 706. The fuel is supplied into the stage 704 via the fuel inlet 708. Preferably, the fuel inlet includes a nozzle 902 that is configured to produce an aerosol. As the fuel impinges on the rotating disk 706, a thin film of fuel is produced.

The inert gas is supplied to the stage 704 via the inert gas inlet 712. As the inert gas contacts the thin film of fuel distributed on the spinning disk 706, it equilibrates with the dissolved oxygen in the fuel. The difference in oxygen concentration in the fuel and the inert gas causes dissolved oxygen in the fuel to be transferred to the inert gas, creating a purge gas that is expelled via the gas outlet 714. A flow of fresh inert gas is maintained to remove the purge gas. As depicted, the inert gas preferably flows counter-current to the fuel flow. Thus, the gas outlet from the last stage (e.g., 704-3) flows into the stage just upstream (e.g., 704-2). The gas and fuel flow in opposite direction across stages.

As may be understood, because the disk 706 is rotating, a centrifugal force or, more accurately, momentum in the radial direction, is generated. The generated centrifugal force is greater for the fuel than it is for the gas. As a result, the fuel is propelled outward toward the outer perimeter 804 of the disk 706. A fuel collection manifold 806 is disposed adjacent to the outer perimeter 804 and collects the deoxygenated fuel. The fuel collection manifold 806 may be coupled to receive the deoxygenated fuel via a simple port, a centrifugal weir, or other suitable extraction device.

The configuration described above may be implemented with multiple parallel disks 706 to increase throughput or may use a series flow liquid configuration where an upstream stage 104 uses the dynamic fuel pressure to feed liquid fuel to a second stage. The CSA may also employ vanes near the nozzle 902 to more efficiently establish a rotating flow pattern than is possible via simple contact with the rotating disk 706.

Figure 10:
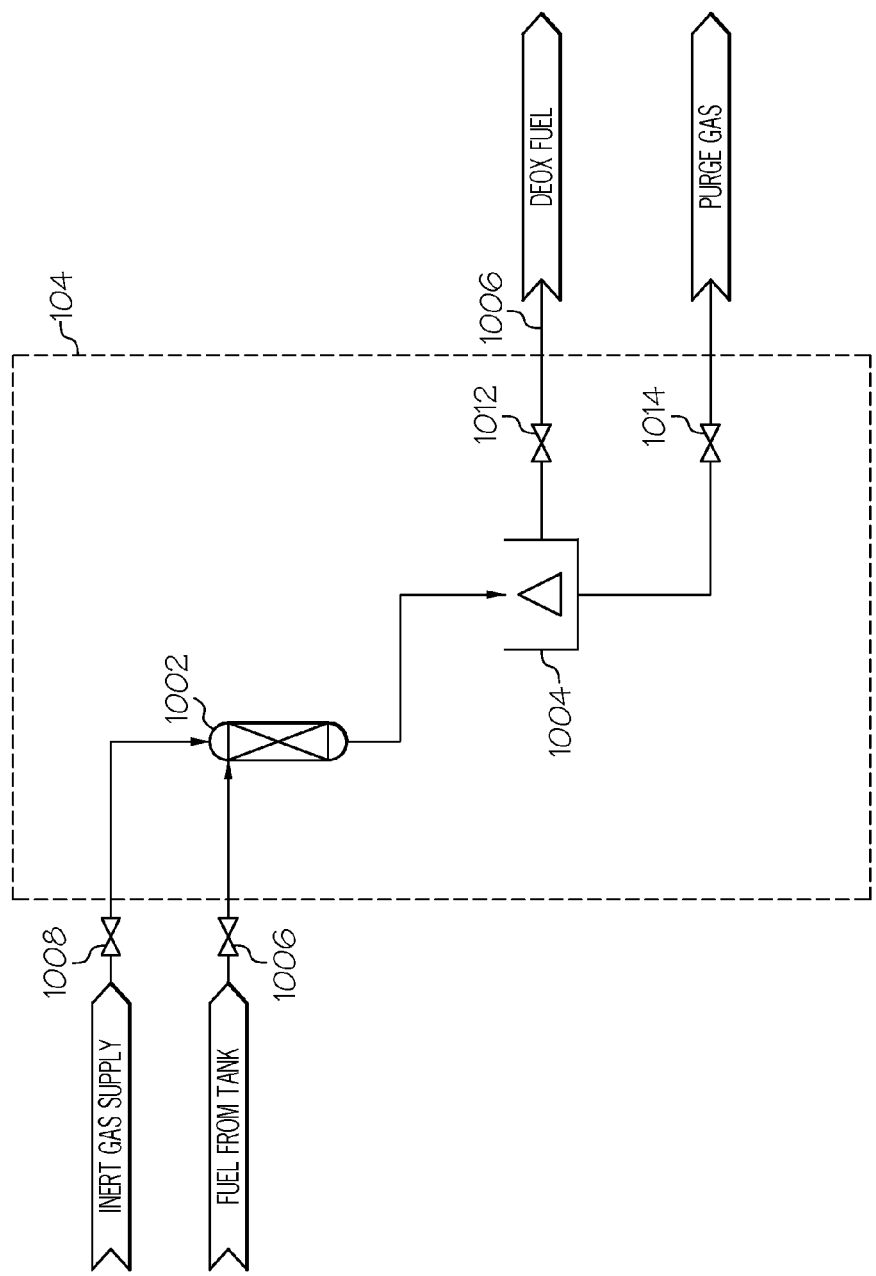

Another embodiment of a fuel deoxygenation system 104 is depicted in FIG. 10, and will now be described. This system 104 includes a separate contactor 1002 and separator 1004. The inert gas and fuel are supplied to the contactor 1002 at a precisely controlled pressure for optimal deoxygenation condition. To control the pressure of these fluids, the system 104 includes two pressure control valves—a fuel pressure control valve 1006 and a gas pressure control valve 1008. As FIG. 10 also depicts, this system 104 may, in some embodiments, also include a fuel back pressure control valve 1012 and a purge gas back pressure control valve 1014 to provide additional pressure control.

The contactor 1002 may be implemented using any one of numerous contactors known in the art. In some embodiments, the contactor 1002 may employ a series of mechanical plates, distributed packing material, or such other mechanical surfaces to provide intimate contact between vapor and liquid phases. As the admixture of fuel and inert gas is processed through the low pressure region of the contactor 1002, and equilibrium consistent with Henry's law is established between the two phases, the outflow from the contactor 1002 is directed to the separator 1004.

The separator 1004 may be implemented using any one of numerous known separators. For example, it may be a simple gravity-based vessel within which the inert gas phase distributes to the upper portion while the liquid fuel phase distributes to the lower volume within the container. To provide increased efficiency, the separator 1004 can be implemented using a centrifugal separator and, as an option, by using pressure gradients such as a vacuum. A centrifugal separator provides the advantages of effective gas bubble removal from the fuel and thus preventing issues such as cavitation in downstream pumps.

Regardless of its specific implementation, the combined fuel/gas phase is supplied to the separator 104, and centrifugal force moves the fuel to the outside part of separator 104 where it is discharged into a DEOX fuel line 1006. The lower density phase, which includes the inert gas and oxygen from the fuel, is recirculated through inert gas purification system and reintroduced into the contactor, or purged from the system. The separator 1004 may also be optimized to incorporate an optimized quantity of dissolved or entrained gas in the fuel to provide suitable compressibility for the fuel pumps.

Figure 11:
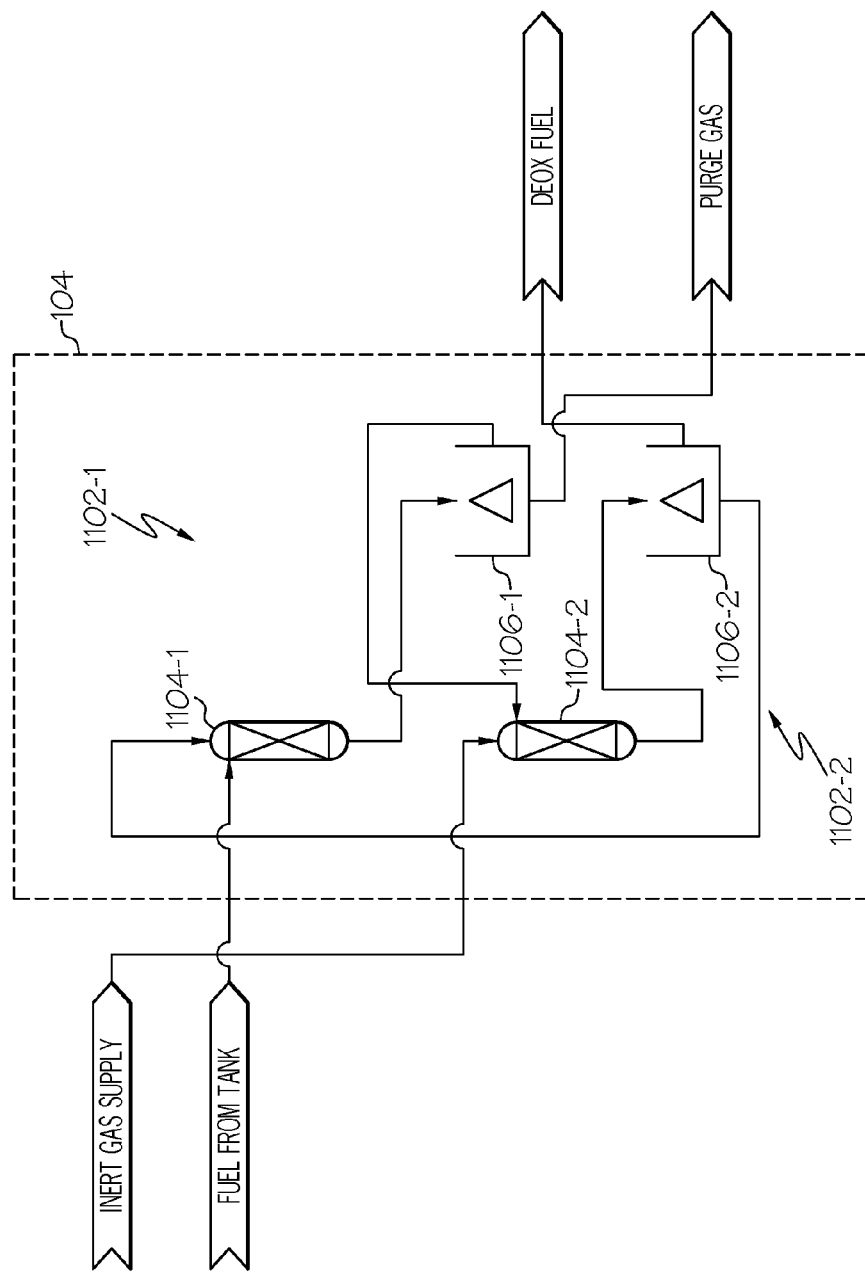

Another embodiment of the deoxygenation system 104 is depicted in FIG. 11. This embodiment uses multiple thermodynamic stages. As used herein, a thermodynamic stage is defined as the equilibrium separation of dissolved oxygen from the fuel at one specific condition of temperature and pressure in a vessel. The depicted embodiment includes two stages—a first stage 1102-1 and a second stage 1102-2. The first and second stages 1102 each include a contactor 1104 (1104-1, 1104-1) and a separator 1106 (1106-1, 1106-2). The stages 1102 are cascaded to provide a greater degree of oxygen separation from the fuel than is possible using a one stage system.

Fuel is supplied to the first contactor 1104-1 where it is contacted with the vapor phase that has already been used to remove oxygen from the fuel in the second stage 1102-2. The mixed phase from the first contactor 1104-1 is supplied to the first separator 1106-1. The deoxygenated fuel from the first separator 1106-1 is supplied to the second contactor 1104-2 where fresh inert gas from the inert gas supply 116 is contacted with the deoxygenated fuel from the first stage 1102-1. The inert gas discharged from the second separator 1106-2 is returned to the first stage 1102-1, and more particularly to the first contactor 1104-1. This counter-flow system provides a higher level of deoxygenation than possible with the single stage system shown in FIG. 10.

Figure 12:
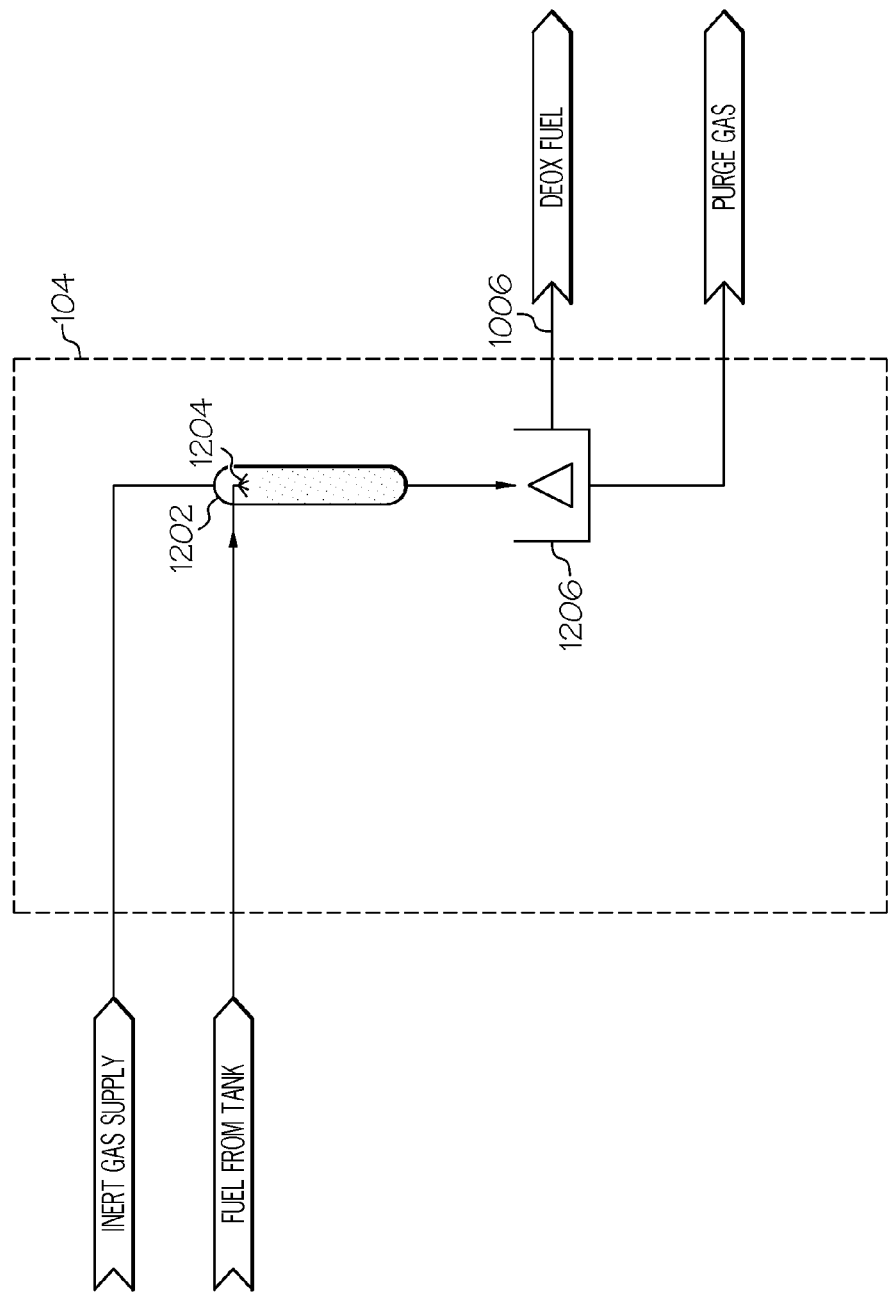

Yet another embodiment, which is depicted in FIG. 12, is similar to the one depicted in FIG. 10, except that the contactor 1202 is based on direct contact. More specifically, fuel is supplied to a nozzle 1204 that is configured to generate small droplets or an aerosol of fuel. The droplets or aerosol of fuel exchange oxygen with the inert gas, and the admixture is supplied to the separator 1206, which may be implemented using any one of the above-described separators. This particular deoxygenation system 104 may be lower in weight and smaller in size due to the relatively fast gas exchange enabled by the small fuel droplets.

Figure 13:
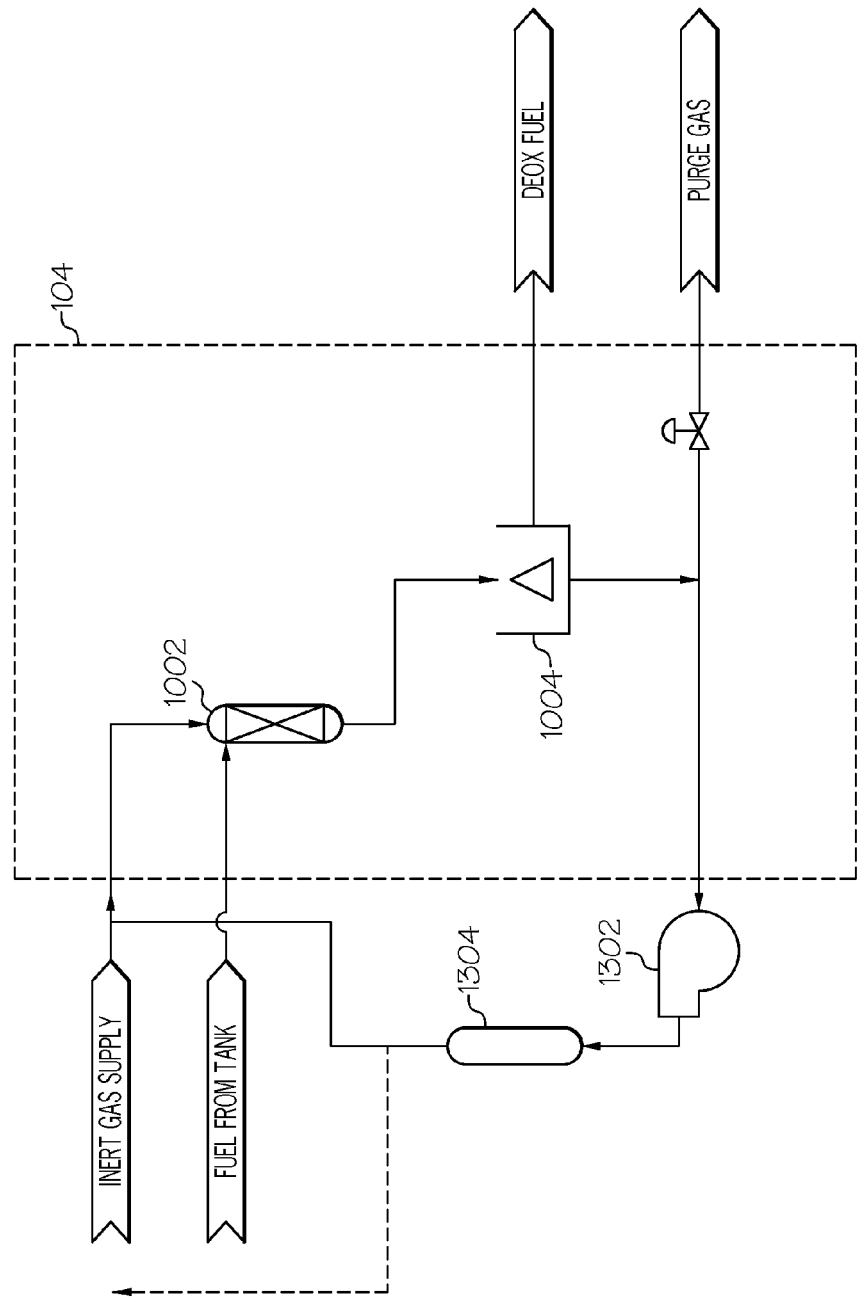

Referring now to FIG. 13, this embodiment depicts a fuel deoxygenation system 104 in which a pump 1302 supplies a fraction of the inert gas is recirculated back to the contactor 1002 to increase the amount of gas contacting the liquid fuel without needing to generate additional inert gas. An accumulator 1304 may optionally be used to control system stability. In the embodiment depicted in FIG. 13, it will be appreciated that the recirculated inert gas may be directed upstream (see the dotted line in FIG. 13) or downstream of the inert gas supply.

Figure 14:
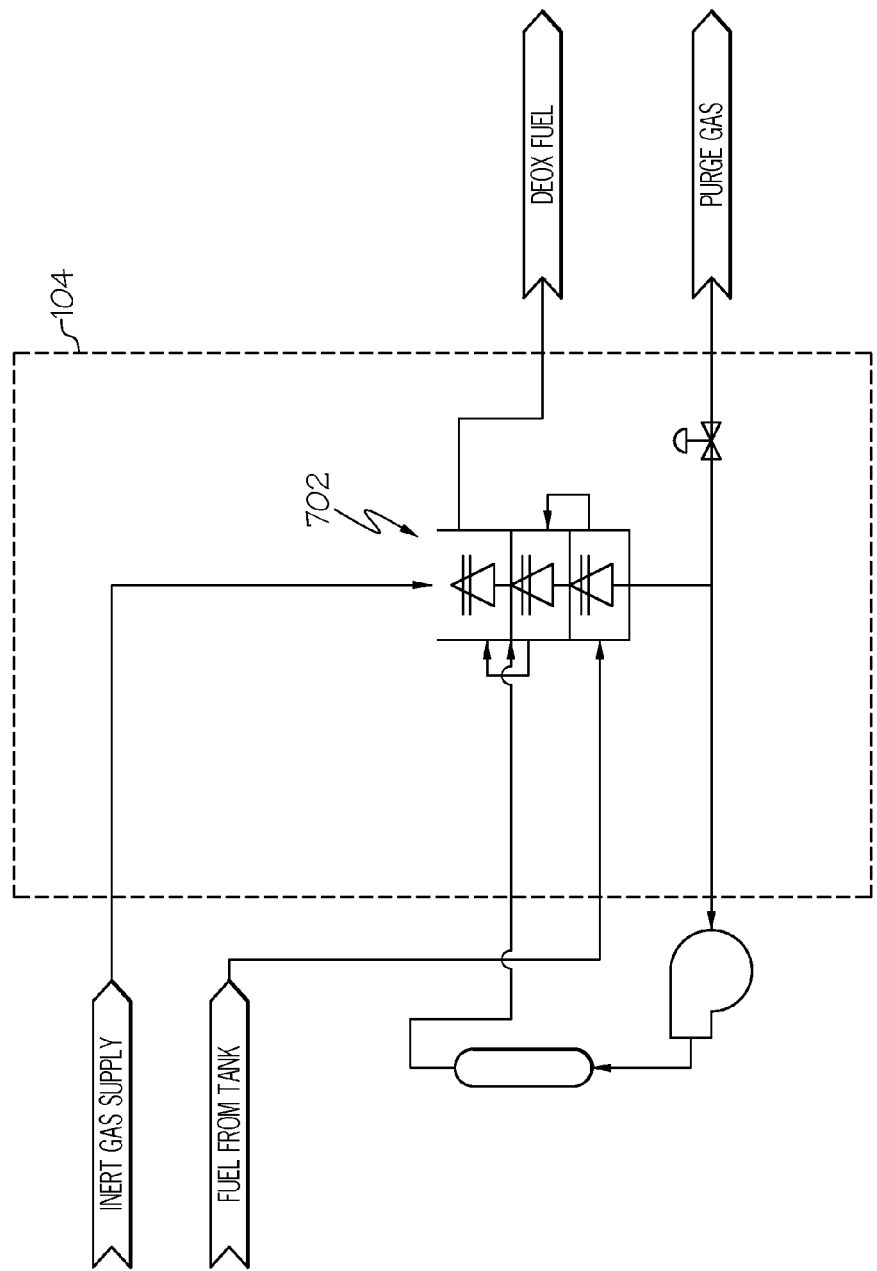

If the fuel deoxygenation system 104 is implemented with multiple stages, such as the embodiment depicted in FIGS. 7-9, the recirculated gas may be input at any stage 704. In the embodiment depicted in FIG. 14, the recirculation gas supplied to the first or second stage leaving the most pure inert gas to contact the final liquid stage, which would combine the benefits of higher recirculation on transfer rate while maintaining the advantage of counter-flow on the final fuel DEOX quality.

The systems and a methods described herein remove dissolved and entrained air from fuel. The systems include a contactor and separator combined with an inert gas supply to remove oxygen. Oxygen removal enables additional heat to be input to the fuel before deposits start to form, which improves aircraft specific fuel consumption (SFC), potentially by 0.5 to 2%. Although the scientific basis for removing oxygen is Henry's law, which is very well understood, a practical approach has not been applied to remove dissolved oxygen from aircraft fuel systems. The systems described herein may be located in various parts of an aircraft, and thus operate at various temperatures, and be integrated with multiple subsystems.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth herein.

What is claimed is:

1. An aircraft fuel deoxygenation and tank inerting system, comprising:
an inert gas source configured to supply inert gas having an oxygen concentration of less than 3%;
a fuel deoxygenation system adapted to receive fuel from a fuel source and the inert gas from the inert gas source, the fuel deoxygenation system configured to remove oxygen from the fuel and thereby generate and supply deoxygenated fuel and oxygen-rich purge gas; and
an air/fuel heat exchanger adapted to receive compressed air from a compressed air source and the deoxygenated fuel from the fuel deoxygenation system, the air/fuel heat exchanger configured to transfer heat from the compressed air to the deoxygenated fuel, to thereby supply cooled compressed air and heated deoxygenated fuel,
wherein the inert gas source comprises:
a fuel tank inerting system, the fuel tank inerting system coupled to receive a portion of the cooled compressed air from the air/fuel heat exchanger and configured to generate inert gas having an oxygen concentration of greater than 3%; and
a secondary purification system coupled to receive the inert gas having an oxygen concentration of greater than 3% from the fuel tank inerting system and configured to generate and supply the inert gas having an oxygen concentration of less than 3%.

2. The system of claim 1, wherein:
the fuel tank inerting system comprises a fuel tank inerting membrane; and
the secondary purification system comprises a second inerting membrane.

3. The system of claim 1, wherein the fuel deoxygenation system comprises:
a housing having a fuel inlet, a fuel outlet, a gas inlet, and a gas outlet, the fuel inlet adapted to receive the fuel from the fuel source, the gas inlet coupled to receive the inert gas from the inert gas source; and
a disk rotationally mounted in the housing and coupled to receive a drive torque, the disk configured, upon receipt of the drive torque, to rotate and produce a thin film of fuel thereon.

4. The system of claim 3, wherein the fuel deoxygenation system further comprises a torque source coupled to the disk and configured to supply the drive torque thereto.

5. The system of claim 3, wherein the fuel deoxygenation system further comprises a plurality of disks rotationally mounted within the housing and coupled to receive the drive torque, each disk configured, upon receipt of the drive torque, to rotate and produce a thin film of fuel thereon.

6. The system of claim 3, wherein:
the housing and the disk define a single stage;
the fuel deoxygenation system further comprises a plurality of stages coupled in fluid-series; and
gas and fuel flow in opposite directions across stages.

7. The system of claim 3, wherein:
the fuel inlet is disposed and configured such that fuel is injected in a direction that is perpendicular to the disk; and
the fuel outlet is disposed adjacent an outer periphery of the disk.

8. The system of claim 3, further comprising a nozzle coupled to the fuel inlet and configured to produce an aerosol of fuel.

9. The system of claim 1, wherein the fuel deoxygenation system comprises:
a contactor adapted to receive the fuel from the fuel source and the inert gas from the inert gas source, the contactor configured to mix the fuel and inert gas and supply a fuel/gas mixture;

a separator in fluid communication with the contactor and coupled to receive the fuel/gas mixture therefrom, the separator configured to remove oxygen from the fuel and thereby generate and supply the deoxygenated fuel and the oxygen-rich purge gas;

a fuel pressure control valve disposed upstream of the contactor and configured to control pressure of the fuel supplied thereto; and a gas pressure control valve disposed upstream of the contactor and configured to control pressure of the inert gas supplied thereto.

10. The system of claim 9, further comprising:
a fuel back pressure control valve disposed downstream of the separator and configured to control pressure of the fuel supplied therefrom; and
a gas pressure control valve disposed downstream of the separator and configured to control pressure of the purge gas supplied therefrom.

11. The system of claim 1, wherein the fuel deoxygenation system comprises:
a contactor adapted to receive the fuel from the fuel source and the inert gas from the inert gas source, the contactor configured to mix the fuel and inert gas and supply a fuel/gas mixture;
a nozzle disposed within the contactor and configured to produce an aerosol of fuel; and
a separator in fluid communication with the contactor and coupled to receive the fuel/gas mixture therefrom, the separator configured to remove oxygen from the fuel and thereby generate and supply the deoxygenated fuel and the oxygen-rich purge gas.

12. An aircraft fuel deoxygenation and tank inerting system, comprising:
an inert gas source configured to supply inert gas having an oxygen concentration of less than 3%;
a fuel deoxygenation system adapted to receive fuel from a fuel source and the inert gas from the inert gas source, the fuel deoxygenation system configured to remove oxygen from the fuel and thereby generate and supply deoxygenated fuel and oxygen-rich purge gas; and
an air/fuel heat exchanger adapted to receive compressed air from a compressed air source and the deoxygenated fuel from the fuel deoxygenation system, the air/fuel heat exchanger configured to transfer heat from the compressed air to the deoxygenated fuel, to thereby supply cooled compressed air and heated deoxygenated fuel,
wherein the fuel deoxygenation system comprises:
a housing having a fuel inlet, a fuel outlet, a gas inlet, and a gas outlet, the fuel inlet adapted to receive the fuel from the fuel source, the gas inlet coupled to receive the inert gas from the inert gas source; and
a disk rotationally mounted in the housing and coupled to receive a drive torque, the disk configured, upon receipt of the drive torque, to rotate and produce a thin film of fuel thereon,
wherein:
the housing and the disk define a single stage;
the fuel deoxygenation system further comprises a plurality of stages coupled in fluid-series; and
gas and fuel flow in opposite directions across stages.

13. The system of claim 12, wherein the fuel deoxygenation system further comprises a torque source coupled to the disk and configured to supply the drive torque thereto.

14. The system of claim 12, wherein the fuel deoxygenation system further comprises a plurality of disks rotationally mounted within the housing and coupled to receive the drive torque, each disk configured, upon receipt of the drive torque, to rotate and produce a thin film of fuel thereon.

15. The system of claim 12, wherein:
the fuel inlet is disposed and configured such that fuel is injected in a direction that is perpendicular to the disk; and
the fuel outlet is disposed adjacent an outer periphery of the disk.

16. The system of claim 3, further comprising a nozzle coupled to the fuel inlet and configured to produce an aerosol of fuel.

17. An aircraft fuel deoxygenation and tank inerting system, comprising:
an inert gas source configured to supply inert gas having an oxygen concentration of less than 3%;
a fuel deoxygenation system adapted to receive fuel from a fuel source and the inert gas from the inert gas source, the fuel deoxygenation system configured to remove oxygen from the fuel and thereby generate and supply deoxygenated fuel and oxygen-rich purge gas; and
an air/fuel heat exchanger adapted to receive compressed air from a compressed air source and the deoxygenated fuel from the fuel deoxygenation system, the air/fuel heat exchanger configured to transfer heat from the compressed air to the deoxygenated fuel, to thereby supply cooled compressed air and heated deoxygenated fuel,
wherein the fuel deoxygenation system comprises:
a contactor adapted to receive the fuel from the fuel source and the inert gas from the inert gas source, the contactor configured to mix the fuel and inert gas and supply a fuel/gas mixture;
a separator in fluid communication with the contactor and coupled to receive the fuel/gas mixture therefrom, the separator configured to remove oxygen from the fuel and thereby generate and supply the deoxygenated fuel and the oxygen-rich purge gas;
a fuel pressure control valve disposed upstream of the contactor and configured to control pressure of the fuel supplied thereto; and
a gas pressure control valve disposed upstream of the contactor and configured to control pressure of the inert gas supplied thereto.

18. The system of claim 17, further comprising:
a fuel back pressure control valve disposed downstream of the separator and configured to control pressure of the fuel supplied therefrom; and
a gas pressure control valve disposed downstream of the separator and configured to control pressure of the purge gas supplied therefrom.

19. An aircraft fuel deoxygenation and tank inerting system, comprising:
an inert gas source configured to supply inert gas having an oxygen concentration of less than 3%;
a fuel deoxygenation system adapted to receive fuel from a fuel source and the inert gas from the inert gas source, the fuel deoxygenation system configured to remove oxygen from the fuel and thereby generate and supply deoxygenated fuel and oxygen-rich purge gas; and
an air/fuel heat exchanger adapted to receive compressed air from a compressed air source and the deoxygenated fuel from the fuel deoxygenation system, the air/fuel heat exchanger configured to transfer heat from the compressed air to the deoxygenated fuel, to thereby supply cooled compressed air and heated deoxygenated fuel, wherein the fuel deoxygenation system comprises:
   a contactor adapted to receive the fuel from the fuel source and the inert gas from the inert gas source, the contactor configured to mix the fuel and inert gas and supply a fuel/gas mixture;
   a nozzle disposed within the contactor and configured to produce an aerosol of fuel; and
   a separator in fluid communication with the contactor and coupled to receive the fuel/gas mixture therefrom, the separator configured to remove oxygen from the fuel and thereby generate and supply the deoxygenated fuel and the oxygen-rich purge gas.

* * * * *